US012346200B2

(12) United States Patent
Fernandes et al.

(10) Patent No.: US 12,346,200 B2
(45) Date of Patent: Jul. 1, 2025

(54) INFRASTRUCTURE INTEGRITY CHECKING

(71) Applicant: TEXAS INSTRUMENTS INCORPORATED, Dallas, TX (US)

(72) Inventors: Desmond Fernandes, Bengaluru (IN); Indu Prathapan, Bengaluru (IN); Jasbir Singh, Bengaluru (IN); Prathap Srinivasan, Bengaluru (IN); Rishav Karki, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 47 days.

(21) Appl. No.: 17/843,204

(22) Filed: Jun. 17, 2022

(65) Prior Publication Data

US 2022/0382627 A1 Dec. 1, 2022

Related U.S. Application Data

(63) Continuation of application No. 17/027,888, filed on Sep. 22, 2020, now Pat. No. 11,366,715.

(51) Int. Cl.
*G06F 11/10* (2006.01)
*G06F 11/07* (2006.01)
*G06F 13/40* (2006.01)

(52) U.S. Cl.
CPC ...... *G06F 11/1044* (2013.01); *G06F 11/0772* (2013.01); *G06F 11/1068* (2013.01); *G06F 13/4018* (2013.01); *G06F 13/4031* (2013.01)

(58) Field of Classification Search
CPC ............. G06F 11/1044; G06F 11/0772; G06F 11/1068; G06F 13/4018; G06F 13/4031; G06F 11/1048

(Continued)

(56) References Cited

U.S. PATENT DOCUMENTS 4,916,704 A * 4/1990 Bruckert ............... G06F 11/165
714/11
6,185,718 B1 * 2/2001 Dell ....................... G11C 29/42
714/801

(Continued)

FOREIGN PATENT DOCUMENTS

EP 0306252 B1 9/1995

OTHER PUBLICATIONS

Wikipedia "northbridge" page from date Aug. 12, 2020, retrieved from: https://web.archive.org/web/20200812170638/https://en.wikipedia.org/wiki/Northbridge_(computing) (Year: 2020).*

(Continued)

*Primary Examiner* — Yair Leibovich
(74) *Attorney, Agent, or Firm* — Michael T. Gabrik; Frank D. Cimino (57) ABSTRACT

A device includes a first component having a data input and a data output. The deice further includes an error correction code (ECC) generation circuit having an input coupled to the data input of the first component. The ECC generation circuit has an output. A second component has a data input coupled to the output of the ECC generation circuit. The second component has a data output. An ECC error detection circuit has a first data input coupled to the data output of the first component, and a second data input coupled to the data output of the second component.

20 Claims, 6 Drawing Sheets

(58) Field of Classification Search
USPC .......................................................... 714/52
See application file for complete search history.

(56) References Cited

U.S. PATENT DOCUMENTS

| | | | |
|---|---|---|---|
| 7,043,679 | B1 | 5/2006 | Keltcher et al. |
| 9,823,968 | B1* | 11/2017 | Fugini .................. G06F 3/0689 |
| 2003/0093744 | A1 | 9/2003 | Leung et al. |
| 2003/0191884 | A1 | 10/2003 | Anjo et al. |
| 2009/0070654 | A1 | 3/2009 | Flachs et al. |
| 2016/0188408 | A1 | 6/2016 | Anderson |
| 2017/0000403 | A1 | 1/2017 | Andrews |

OTHER PUBLICATIONS

Wikipedia "shift register" page from date Aug. 10, 2020, retrieved from: https://web.archive.org/web/20200801035507/https://en.wikipedia.org/wiki/Shift_register (Year: 2020).*

International Search Report and Written Opinion for PCT/US2021/050007 mailed Dec. 2, 2021, 4 pages.

Wikipedia, "Error Correction Code" page, obtained Aug. 13, 2020, using the Wayback machine, from https://web.archive.org/web/20200813031517/https://en.wikipedia.org/wiki/Error_correction_code, 2 pages.

Extended European Search Report; Application No./Patent No. 21873200.6-1203/4217870 PCT/US2021050007; mail date Jan. 24, 2024; 8 pages.

* cited by examiner

INFRASTRUCTURE INTEGRITY CHECKING

This application is a continuation of U.S. patent application Ser. No. 17/027,888, filed Sep. 22, 2020, which is incorporated herein by reference in its entirety. U.S. patent application Ser. No. 17/027,888 will issue as U.S. Pat. No. 11,366,715 on Jun. 21, 2022.

BACKGROUND

Some electronic systems benefit from increased assurance of system behavior. For example, automobiles today include sophisticated electronic systems that should incorporate the ability to detect faults to thereby ensure safe operation of the automobile. Industrial and other applications also benefit from fault detection.

SUMMARY

In at least example, a device includes a first component having a data input and a data output. The device further includes an error correction code (ECC) generation circuit having an input coupled to the data input of the first component. The ECC generation circuit has an output. A second component has a data input coupled to the output of the ECC generation circuit. The second component has a data output. An ECC error detection circuit has a first data input coupled to the data output of the first component, and a second data input coupled to the data output of the second component.

BRIEF DESCRIPTION OF THE DRAWINGS

For a detailed description of various examples, reference will now be made to the accompanying drawings in which.

DETAILED DESCRIPTION

Figure 1:
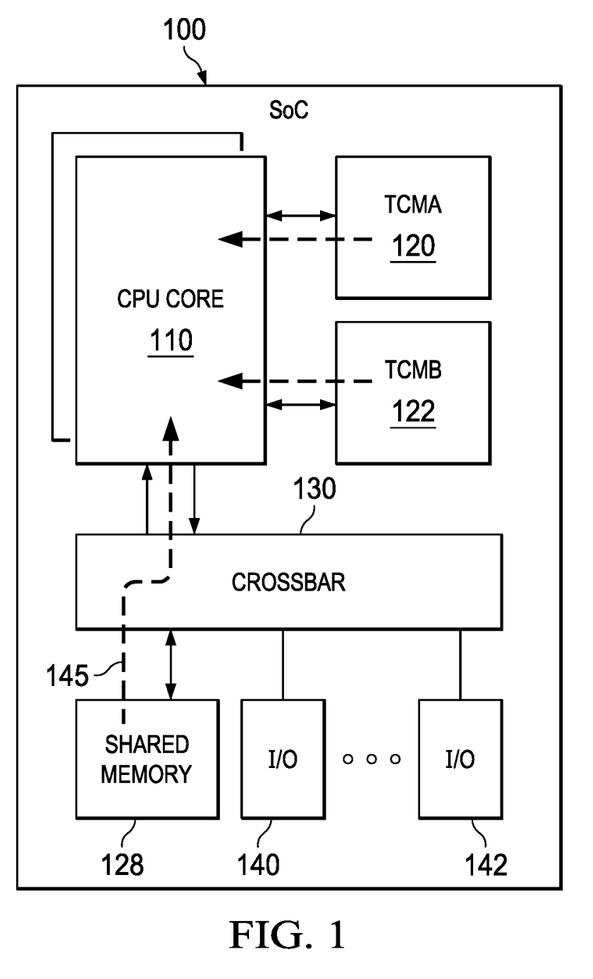
FIG. 1 illustrates an example of a system-on-chip (SoC) including a crossbar interconnect.

FIG. 1 shows an example architecture of a system-on-chip (SoC) 100 that includes one or more central processing unit (CPU) cores 110, tightly coupled memories A and B (TCMA and TCMB) 120 and 122, a crossbar 130, shared memory 128, and input/output (I/O) devices 140 and 142. Each CPU core 110 is coupled to a respective tightly coupled memory. For example, if there are two CPU cores 110, one CPU core is coupled to TCMA 120 and the other CPU core 110 is coupled to TCMB 122. Each CPU core 110 is able to store information, and retrieve information from, its respective tightly coupled memory. The CPU cores 110 are coupled to the crossbar 130, and the crossbar 130 is coupled to the shared memory 128 and to I/O devices 140, 142. The I/O devices 140, 142 may comprise network ports (e.g., controller area network interface, serial peripheral interface, etc.), memory, etc. The SoC 100 may have only one I/O device or two or more I/O devices. The I/O devices 140, 142 are accessible to the CPU cores 110 via the crossbar 130. The shared memory may be implemented, for example, as random-access memory (RAM). The CPU cores 110 can access the common, shared memory 128 through the crossbar 130. In one example, the CPU cores 110 have a 400 MHz clock frequency and the size of each tightly coupled memory (TCMA 110, TCMB 122) is 32 kilobytes (KB). The shared memory 128, however, has a larger size (e.g., 1 mega-byte (MB) than TCMA 110 or TCMB 120.

The shared memory 128 can be used, for example, to store instructions and data. The instructions are retrieved by the CPU core 110(s) through crossbar 130 as indicated by dashed arrow 145. Data also can be written to, or retrieved from, the shared memory 128 by the CPU cores 110. Because such information (instructions and/or data) traverses the crossbar 130 between the shared memory 128 and the CPU cores 110, a fault in the crossbar 130 can affect the integrity of the information. That is, an instruction (which comprises multiple bits) retrieved from the shared memory 128 may have one or more of its bits change state (flip)—a "0" becomes a "1" or a "1" becomes a "0". Such faults can detrimentally impact the operation of a system (e.g., an automobile) containing SoC 100. The examples described herein implement fault detection capability within the crossbar 130.

Figure 2:
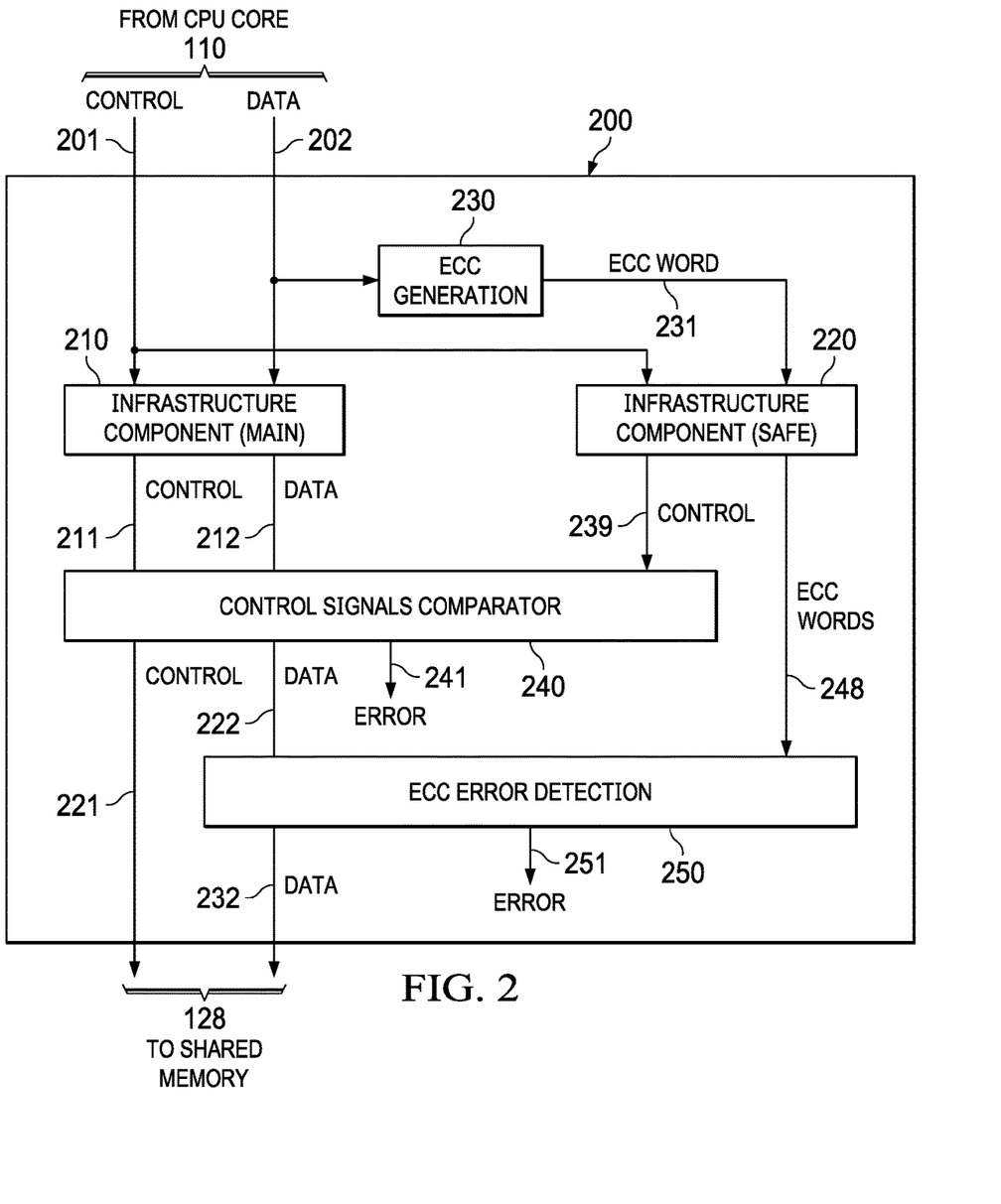
FIG. 2 illustrates an example implementation of the crossbar interconnect including multiple infrastructure components.

FIG. 2 shows an example circuit (e.g., an integrated circuit) implementation of at least a portion of crossbar 130. In one example as noted above, the crossbar 130 can be used to transfer data between the CPU core 110 and the shared memory. The crossbar 130, however, can be used to transfer data between slave devices under the control of a direct memory access (DMA) controller. In general, the crossbar 130 can be used to transfer data between two devices. The circuit 200 of FIG. 2 includes an infrastructure component (Main) 210, and infrastructure component 220 (Safe), an error correction code (ECC) generation circuit 230, a control signal comparator circuit 240, and an ECC error detection circuit 250. The signals from the CPU core 110 include control bits 201 and data bits 202. The control bits 202 encode information about a transaction, such as, an address, whether the transaction is a read or a write, burst size, priority, privilege level, and access type. In the context of a write transaction, the data bits 202 include the data to be written to the shared memory 128.

The control bits 201 and data bits 202 are provided to an infrastructure component (Main) 210. The data bits 202 also provided to the ECC generation circuit 230. The ECC generation circuit 230 calculates the ECC for the data bits 202 and provides the calculated ECC 231 to the infrastructure component (Safe) 220. The control bits 201 also are provided to the ECC infrastructure component 220.

In one example, the infrastructure component (Main) 210 performs a conversion on the data bits 202. In one example, the infrastructure component (Main) 210 performs a bus-width conversion of the data bits 202. The data bus providing the data bits 202 between the CPU core 110 and circuit 200 may be, for example, a 128-bit bus, but the width of the data bus to the shared memory 128 is 32-bits. As such, the infrastructure component (Main) 210 converts the data bits 202 from a 128-bit word to four, sequential 32-bit words. As such, the width of data bits 212 is 32 bits. The example of infrastructure component (Main) 210 converting data between a width of 128 bits and a width of 32 bits is discussed herein, the infrastructure component (Main) 210 may convert between any bus widths. In other examples, the infrastructure component (Main) 210 performs address decoding, arbitration, bus protocol conversion, and/or burst split. The infrastructure component (Main) 210 also may modify the control bits 201. In the example in which the infrastructure component (Main) 210 performs a bus-width conversion of the data bits 202, the infrastructure component (Main) 210 may convert the byte count for each of the four, sequential words to one-fourth the byte count provided in the control bits 201 input to the infrastructure component (Main) 210.

Data bits 212 flow through control signal comparator 240 and are provided as data bits 222 to the ECC error detection circuit 250. In this example, the width of data bits 222 is the same as the width of data bits 212 (e.g. a width of 32 bits). The control bits 211 from the infrastructure component (Main) 210 are also provided to the control signal comparator 240. The control bits 239 from the infrastructure component (Safe) 220 are provided to the control signal comparator 240 as well. The control signal comparator 240 compares the control bits 239 from the infrastructure component (Safe) 220 to the control bits 211 from the infrastructure (Main) 210. In one example, the control signal comparator 240 performs a bit-wise comparison of control bits 211 and control bits 239. Error signal 241 indicates whether or not the control bits 211 and 239 match. In one example, Error signal 241 is a single bit signal (e.g., 0 indicates that control bits 211 and 239 match, and 1 indicates a mismatch). If there is a mismatch, the CPU core 110 may be interrupted (or an external host may be signaled) which then executes an interrupt service routine to respond to the error. Assuming no error, the control bits 221 from the control signal comparator 240 comprise control bits 211 and are provided as an output from the crossbar 130 (e.g., to shared memory 128).

The infrastructure component (Safe) 220 performs much the same conversion process as infrastructure component (Main) 210 and in some examples, is another instance of the same circuitry that comprises infrastructure component (Main) 210. Whereas infrastructure component (Main) 210 receives data bits 202 as an input infrastructure component (Safe) 220 receives ECC bits 231 as an input. For data bits 202, which comprises 128-bit wide words, the ECC generation circuit 230 computes 28 bits of ECC and ECC bits 231 in the form of a 128-bit wide word.

Figure 3:
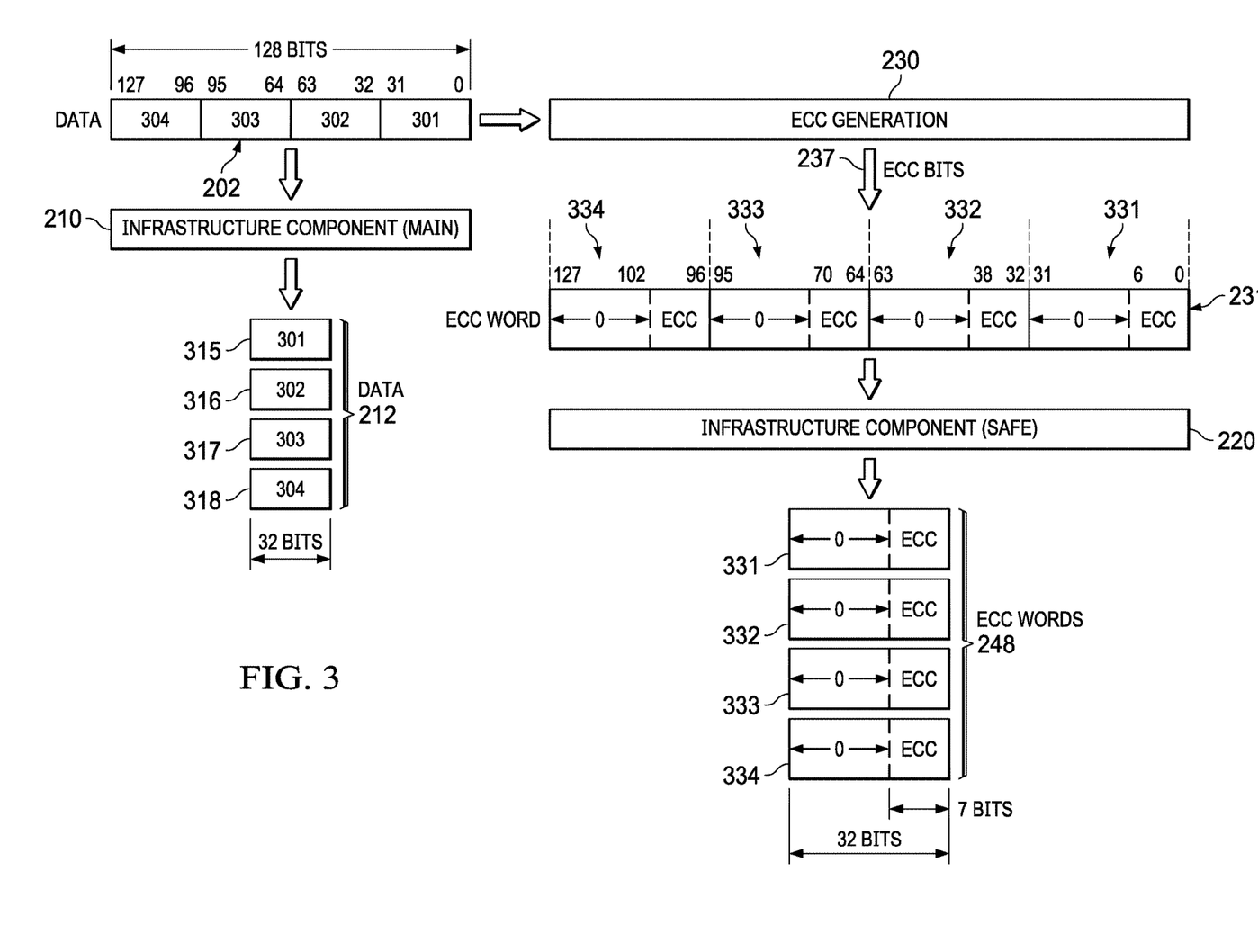
FIG. 3 illustrates an example of the function performed by the infrastructure components.

FIG. 3 illustrates the data width conversion performed by the infrastructure component (Main) 210 and infrastructure component (Safe) 220 as well as the function performed by the ECC generation circuit 230. A 128-bit word is shown as data bits 202. The data word comprises four 32-bit portions 301-304. Portion 301 comprises the lower order data bits 0 through 31. Portion 302 comprises the next set of 32 data bits—bits 32 through 63. Portion 303 comprises bits 64 through 95. Portion 304 comprises bits 96 through 127.

Infrastructure component (Main) 210 forms four 32-bit words 315-318, which may be clocked out from the infrastructure component (Main) 210 in four separate clock cycles. Thirty-two-bit word 315 comprises portion 301 from the original 128-bit data word. Thirty-two-bit words 316-318 comprise respective portions 302-304 as shown.

The ECC generation circuit 230 also receives the 128-bit data word (data bits 202), calculates the ECC bits for the associated 128-bit data word, and forms a 128-bit, ECC word 231. For a 128-bit data word, the ECC generation circuit 230 calculates 28 bits of ECC, as shown at 237. The 28 bits of ECC are separated into four, 7-bit ECC portions. The lower order 7 ECC bits are populated into the first 7 bits of ECC word 231 in bit positions 0 through 6 as shown. The next higher order 7 ECC bits are populated into bit positions 32-38. Similarly, the next two sets of 7 ECC bits are populated into bit positions 64-70 and bit positions 96-102, as shown. The remaining 100 bits of the ECC word 231 are populated in this example with 0's. As such, ECC word 231 generated by the ECC generation circuit 230 comprise four discrete segments of ECC bits. Each 32-bit portion of the 128-bit ECC word 231 comprises 7 ECC bits.

The infrastructure component (Safe) 220 receives the 128-bit ECC word 231 and performs the same conversion process as described above for the infrastructure component (Main) 210. That is, the infrastructure component (Safe) 220 generates four, 32-bit words 331-334. Thirty-two-bit word 331 comprises the lowest order 32 bits of ECC word 231, which itself comprises 7 ECC bits in the first 7 bit positions and 0's in the remaining bit positions. Similarly, 32-bit word 332 comprises the next set of 32 bits of ECC word 231, with the next 7 ECC bits in its 7 lowest order bit positions. Thirty-two-bit words 333 and 334 are similarly formed, each with 7 ECC bits in its lowest order 7 bits, as shown.

Thirty-two-bit words 315-318 each comprise 32 bits of the original 128 bits of data, and thirty-two-bit words 331-334 each comprise the 7 ECC bits corresponding to the 32 data bits in each associated word 331-334. That is, the ECC bits in word 331 comprise the ECC bits calculated for the 32 bits of data in word 315. Similarly, the ECC bits in words 332-334 comprise the ECC bits calculated for the 32 bits of data in words 316-318, respectively. Data words 315-318 are represented in FIG. 2 as data bits 222. ECC words 331-334 are represent in FIG. 2 as ECC words 248.

Referring back to FIG. 2, data bits 222 and ECC words 248 are provided to the ECC error detection circuit 250. For each of the 32-bit data words (315-318 comprising data bits 222, the ECC error detection circuit 250 generates the 7 ECC bits and compares the newly calculated ECC bits to the ECC bits in the corresponding ECC words 248 (words 331-334). Error signal 251 (which may interrupt the CPU 110 or cause an external host to be signaled) indicates whether or not the ECC bits match (e.g., an Error signal with a value of 0 means the ECC bits matched, and an Error signal with a value of 1 means that at least one ECC bit did not match. In the absence of an ECC error, data bits 232 from the ECC error detection circuit 250 comprises data bits 222. Thus, if neither Error signal 241 nor Error signal 251 indicates an error (i.e., no control bit error and no ECC bit error), the control bits 221 and data bits 232 are provided to a downstream component such as shared memory 128.

Figure 4:
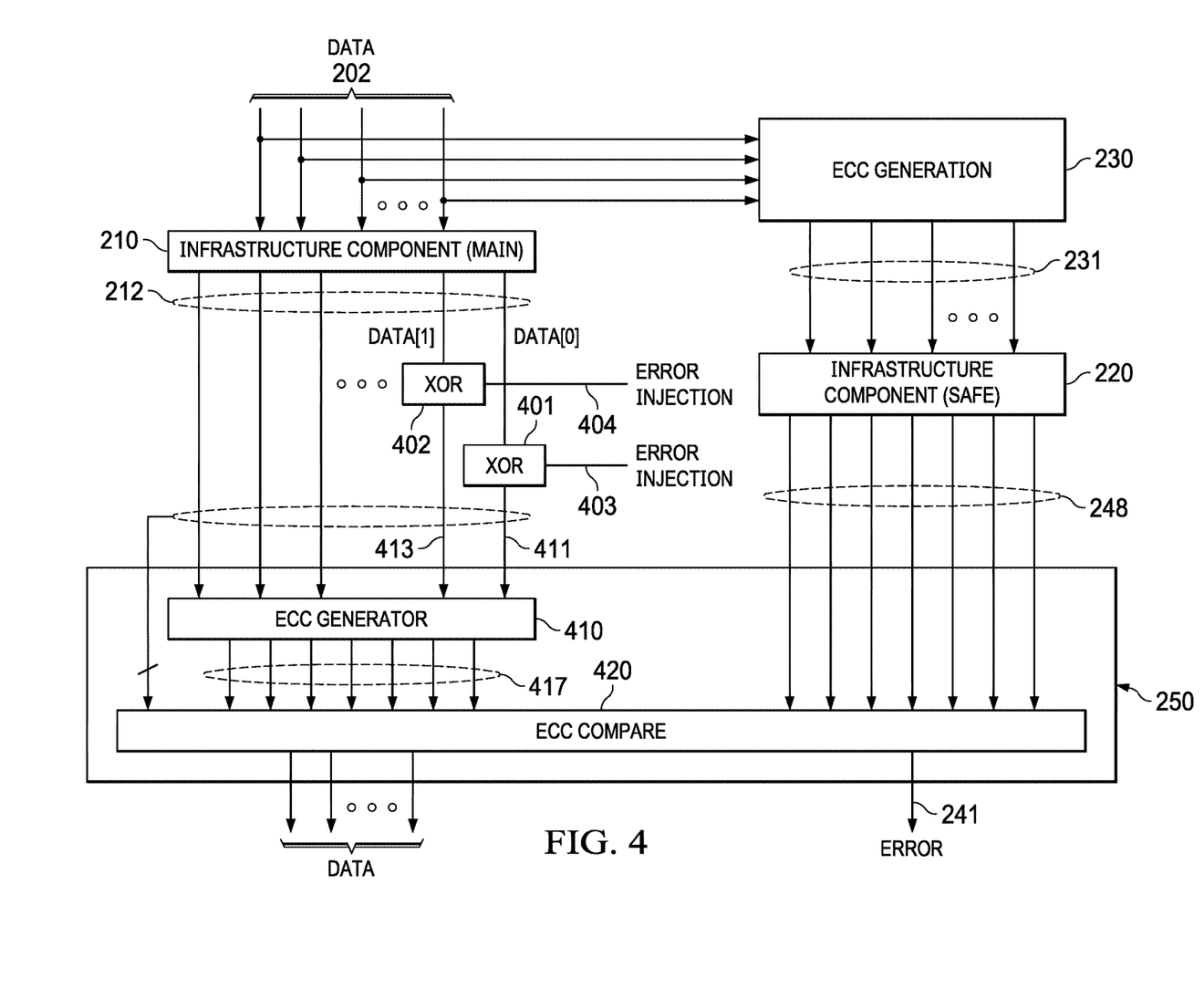
FIG. 4 illustrates an example of error injection to test error correction code (ECC) performance.

FIG. 4 illustrates an implementation in which the ECC error detection within circuit 200 can be tested. In the example of FIG. 4, the logic states of one or more of the data bits are intentionally changed (a "0" is changed to a "1", and vice versa). The circuit of FIG. 4 is largely the same as that of FIG. 2. The control bits of FIG. 2 are not shown in the example of FIG. 4. The ECC error detection circuit 250 includes an ECC generator circuit 410 coupled to an ECC compare circuit 420. The data bits 212 from infrastructure component (Main) 210 are provided to the inputs of ECC generator circuit 410.

One or more of the data bits 212 are provided to inputs of exclusive-OR (XOR) gates. In the example of FIG. 4, the least significant two bits of data bits 212 are coupled to respective inputs of XOR gates. XOR gate 401 is receives the least significant data bit, DATA[0] on one of its inputs and an ERROR INJECTION signal 403 on its other input. The output 411 of XOR gate 401 is coupled to a respective input of ECC generator circuit 410. Similarly, XOR gate 402 is receives the DATA[1] on one of its inputs and an ERROR XOR gate 401 is receives the least significant data bit, DATA[0] on one of its inputs and an ERROR INJECTION signal 403 on its other input. The output 411 of XOR gate 401 is coupled to a respective input of ECC generator circuit 410. ECC signal 404 on its other input. The output 413 of XOR gate 402 is coupled to a respective input of ECC generator circuit 410.

XOR gates 401 and 402 function to invert the polarity of their respective data inputs bits when it is desired to test the operation of the ECC error detection circuit 250. Otherwise, during normal, run-time operation, the polarity of the data bits remains unchanged. When ERROR INJECTION signal 403 is low (0), the polarity of the signal on output 411 of XOR gate 401 is the same as the polarity of DATA[0]—if DATA[0] equals 1, then the output 411 is a 1, and if DATA[0] equals 0, then the output 411 is a 0. If ERROR INJECTION signal 403 is high (1), then XOR gate 401 causes its output 411 to have the opposite polarity as DATA[0]—that is XOR gate 401 flips the logical state of DATA[0] when ERROR INJECTION signal 403 is forced high. The operation of XOR gate 402 functions in the same way to flip the logic level of DATA[1] when its respective ERROR INJECTION signal 404 is asserted high; otherwise, the XOR gate 402 keeps the logic level of its output 413 the same as the logic level of DATA[1] when ERROR INJECTION signal 404 is 0.

In the example of FIG. 4, one or two of data bits 212 can be "flipped". Such flipped bit states are not also reflected on data bits 202 provided to the infrastructure component (Safe) 220, which itself computes ECC for the data bits. Thus, an error can be injected into data bits 212 and, if it functions correctly, the ECC error detection circuit 250 will detect the error and assert ERROR 241 accordingly. ECC generator circuit 410 computes the ECC of the data bits on its input, which may include one or more data bits whose logic states have been changed. The ECC compare circuit 420 receives the ECC words 248 from the infrastructure component (Safe) 220, extracts the ECC from the ECC words 248, and compares them to the newly computed ECC 417 from the ECC generator circuit 410. If a difference is detected, ERROR signal 241 is asserted, for example, high to indicate an ECC error condition.

Figure 5:
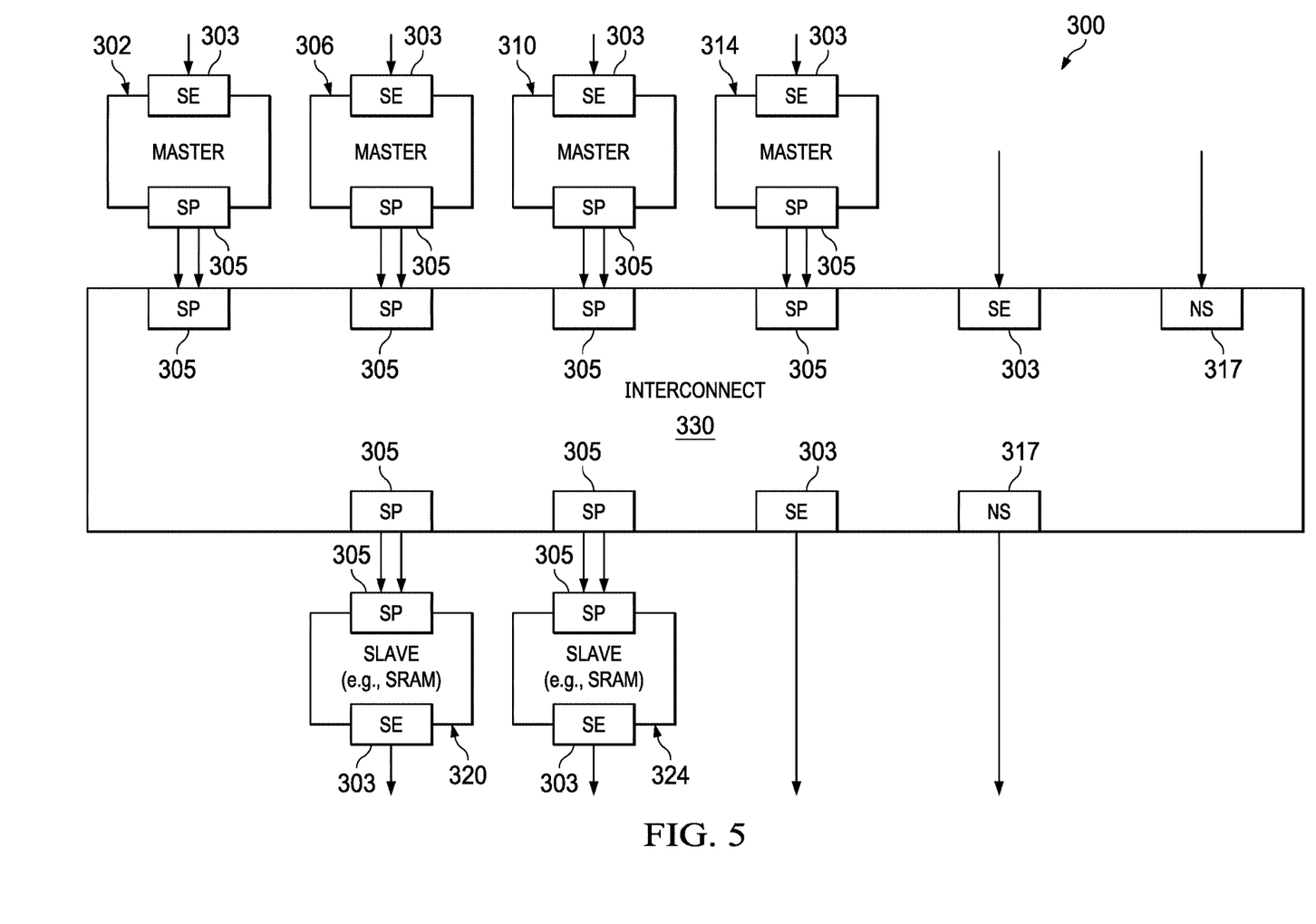
FIG. 5 illustrates an example of a system including multiple masters and slaves.

FIG. 5 shows an example of a system 300 comprising multiple masters 302, 306, 310, and 314, multiple slaves 320 and 324, and an interconnect 330. The component shown in FIG. 5 may be provided on a semiconductor die. Any suitable number of masters and slaves can be provided. Information can flow bi-directionally through the interconnect 330 between any master 302-314 and any slave 320 and 324. As data and control signals from through any given node (master, interconnect, or slave), the complete data and control signal check (per the example of FIG. 2) need not be performed at each node. That is, if master 302 is sending a communication to slave 324, the logic of FIG. 2 need not be performed multiple times along the communication path—within each of master 302, interconnect 330, and slave 324.

Instead, master 302 may include an infrastructure component 220 to generate the ECC words 248 and provide the control bits 239 but does not also compare the control bits and generate and compare the ECC bits. Instead, the ECC words 248 and control bits 239 may be forwarded out of the master 302 and through the infrastructure 330 to the slave 324. The slave 324 may include the logic to compare the control bits and generate and compare the ECC bits to detect an error. As such, masters 302-314 and slaves 320 and 324 have logic denoted as Safe End (SE) 303 and Safe Parse (SP) 305. SE 303 comprises the logic to generate the control bits 239 and ECC words 248 for a communication in one direction (e.g., from master to slave) as well as the logic to compare the control and ECC bits for a communication in the opposite direction (slave to master).

Figure 6:
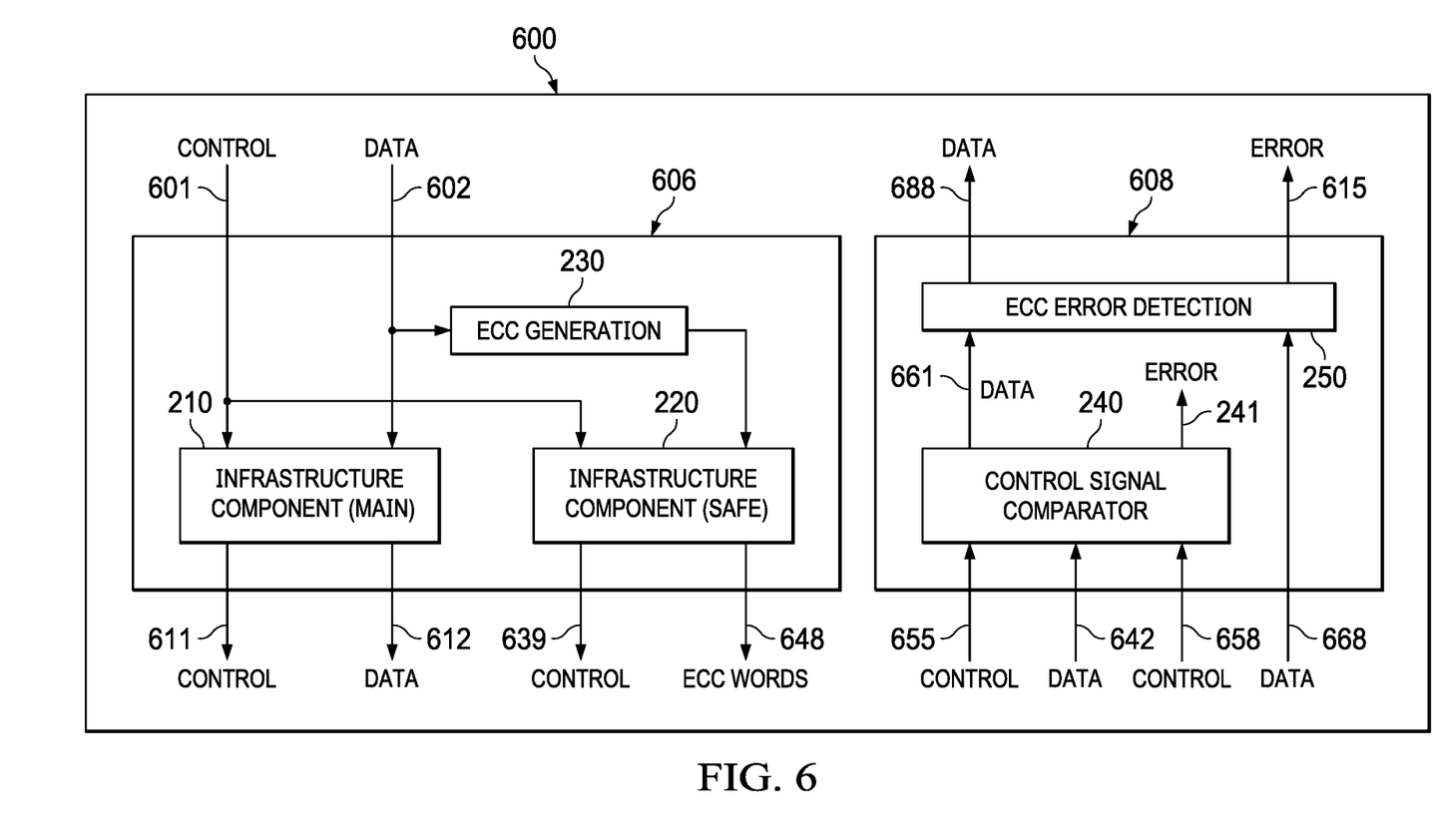
FIG. 6 shows an example implementation of the control bit and data integrity checking in a distributed system.

FIG. 6 shows an example of a circuit 600 that can be implemented as part of masters 302-314 and/or slaves 320-324. The circuit 600 includes circuits 606 and 608. Circuit 606 includes the infrastructure component (Main) 210, the infrastructure component (Safe) 220, and the ECC generator 230 described above. Circuit 608 includes the ECC error detection circuit 250 and the control signal comparator 240 also described above. The functionality of these components is largely as explained above. In the example implementation of FIG. 2, the control bits 211 and 239 and data bits 212 are provided to the control signal comparator 240 within the same device. In the example implementation of FIG. 6, control bits 611 and data bits 612 from infrastructure component (Main) 210 as well as the control bits 639 and ECC words 648 from the infrastructure (Safe) 220 are not provided to the circuit 608 within the same device (master, slave). Instead, these signals are provided through the interconnect 330 to the control signal comparator 240 of the destination device. That is, the control bits 655 and 658 and data bits 642 and 668 shown as inputs to circuit 608 in FIG. 6 originated from a device across the interconnect 330. As such, the integrity checking for the control bits and data bits (ECC) are performed within the destination device whereas the generation of the ECC words and separate control bits to use in the integrity checking is made within the device that originates the communication transaction. For example, if master 302 is attempting to send a transaction to slave 324, master 302 generates the control bits 639 and ECC words 648 from its infrastructure component (Safe) 220 and provides control bits 639, ECC words 648 as well as control bits 611 and data bits 612 across the interconnect 330. The slave 324 performs receives these bits and performs the control and data bit integrity checks within its own control signal comparator 240 and ECC error detection circuit 250. Interim checks within, for example, interconnect 330 are not necessarily performed.

SP's 305 designate interfaces that pass through the control and data bits and ECC words without performing the integrity checks. SE's 303 designate the interfaces that have the circuits 606 and 608 as shown in the example of FIG. 6. Non-safe (NS) interfaces 317 designate interfaces that do not implement the integrity techniques described herein and thus do not include the extra control bits 639 and ECC words 648 that would otherwise be usable for the described integrity checks.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A device comprising:
   a central processing unit (CPU) core;
   a shared memory; and a hardware interconnect coupled to the CPU core and coupled to the shared memory, wherein the hardware interconnect includes:
  a first component including a data input coupled to the CPU core and configured to receive a set of data bits, and a control input coupled to the CPU core, the control input of the first component configured to receive a control signal, wherein the first component is configured to output the set of data bits as a plurality of sequential data words, in which a bit width of each word of the plurality of sequential data words is less than a bit width of the set of data bits;
  an error correction code (ECC) generation circuit including an input coupled to the data input of the first component, wherein the ECC generation circuit further includes an output;
  a second component including:
    a data input coupled to the output of the ECC generation circuit; and
    a control input coupled to the control input of the first component, the control input of the second component configured to receive the control signal; and
  a compare circuit coupled to the first and second components.

2. The device of claim 1,
wherein the compare circuit includes a first control input and a second control input,
wherein the first component further includes a control output coupled to the first control input of the compare circuit,
wherein the second component further includes a control output coupled to the second control input of the compare circuit, and
wherein the compare circuit further includes a control output coupled to the shared memory.

3. The device of claim 2, wherein the compare circuit is configured to:
receive, from the first component, a first set of control bits at the first control input of the compare circuit;
receive, from the second component, a second set of control bits at the second control input of the compare circuit;
compare the first and second sets of control bits; and
output an error signal indicating a result of comparing the first and second sets of control bits.

4. The device of claim 1,
wherein the ECC generation circuit is a first ECC generation circuit,
wherein the hardware interconnect further includes a second ECC generation circuit including an input and an output,
wherein the first component further includes a data output coupled to the input of the second ECC generation circuit,
wherein the compare circuit includes a first input coupled to the output of the second ECC generation circuit, a second input, and a data output coupled to the shared memory,
wherein the second component further includes an output coupled to the second input of the compare circuit.

5. The device of claim 4, wherein the compare circuit is configured to:
receive, from the second ECC generation circuit, a first ECC word at the first input of the compare circuit;
receive, from the second component, a second ECC word at the second input of the compare circuit;
compare the first and second ECC words; and
output an error signal indicating a result of comparing the first and second ECC words.

6. The device of claim 1,
wherein the ECC generation circuit is a first ECC generation circuit, and
wherein the hardware interconnect further includes:
  a second ECC generation circuit including an input; and
  a logic gate comprising an input and an output coupled to the input of the second ECC generation circuit,
  wherein the first component further includes an output coupled to the input of the logic gate.

7. A device comprising:
a central processing unit (CPU) core;
a shared memory; and
a hardware interconnect coupled to the CPU core and coupled to the shared memory, wherein the hardware interconnect includes:
  a first component including a data input coupled to the CPU core and configured to receive a set of data bits, and a control input coupled to the CPU core, the control input of the first component configured to receive a control signal, wherein the first component is configured to output the set of data bits as a plurality of sequential data words, in which a bit width of each word of the plurality of sequential data words is less than a bit width of the set of data bits;
  an error correction code (ECC) generation circuit including an input coupled to the data input of the first component, wherein the ECC generation circuit further includes an output; and
  a second component including:
    a data input coupled to the output of the ECC generation circuit; and
    a control input coupled to the control input of the first component, the control input of the second component configured to receive the control signal;
wherein the first component comprises a first instance of a bus-width conversion circuit, and
wherein the second component comprises a redundant instance of the bus-width conversion circuit.

8. The device of claim 1, wherein the first component is configured to:
receive the set of data bits in parallel from the CPU core.

9. The device of claim 1, further comprising a system-on-chip,
wherein the CPU core, the hardware interconnect, the shared memory are integrated on the system-on-chip.

10. A method comprising:
receiving, by a first component, a first set of data bits;
outputting, by the first component, a second set of data bits based on the first set of data bits;
outputting, by a first error correction coding (ECC) generation circuit, a first ECC word based on the first set of data bits;
outputting, by a second component, a second ECC word based on the first ECC word;
computing, by a second ECC generation circuit, a first ECC based on the second set of data bits;
extracting, by an ECC comparison circuit, a second ECC from the second ECC word; and
comparing, by the ECC comparison circuit, the first and second ECCs.

11. The method of claim 10, further comprising:
outputting an error signal based on a result of comparing the first and second ECCs; wherein the error signal is outputted at a first logic level when the result of the comparing is that there is no difference between the first and second ECCs and outputted at a second logic level when the result of the comparing is that there is a difference between the first and second ECCs.

12. The method of claim 10, further comprising injecting an error into at least one of a least significant bit and a second least significant bit of the second set of data bits, wherein the second ECC generation circuit computes the first ECC based on the second set of data bits with the injected error.

13. The method of claim 10,
wherein receiving the first set of data bits comprises receiving the first set of data bits in parallel,
wherein outputting the second set of data bits comprises outputting the set of data bits in parallel as a plurality of sequential data words, and
wherein a bit width of each word of the plurality of sequential data words outputted by the first component is less than a bit width of the set of parallel data bits received by the first component.

14. A device comprising:
a hardware interconnect;
a first set of hardware components including:
    a first hardware component including a data input, a control input, a first output, and a second output;
    an error correction code (ECC) generation circuit including an input coupled to the data input of the first hardware component, wherein the ECC generation circuit further includes an output; and
    a second hardware component including a data input coupled to the output of the ECC generation circuit, a control input coupled to the control input of the first hardware component, a first output, and a second output; and
a second set of hardware components including:
    a control signal comparator including a first input coupled to the first output of the first hardware component via the hardware interconnect, a second input coupled to the second output of the first hardware component via the hardware interconnect, and a third input coupled to the first output of the second hardware component via the hardware interconnect, wherein the control signal comparator further includes a first output, and a second output configured to output an error signal; and
    an ECC detection circuit including a first input coupled to the first output of the control signal comparator, and a second input coupled to the second output of the second hardware component via the hardware interconnect, wherein the ECC detection circuit further includes a data output and an error signal output.

15. The device of claim 14, further comprising a central processing unit (CPU) core coupled to the data input of the first hardware component and coupled to the control input of each of the first hardware component and the second hardware component,
wherein the second output of the control signal comparator is coupled to the CPU core, and
wherein the error signal output of the ECC detection circuit is coupled to the CPU core.

16. The device of claim 15, further comprising:
a shared memory coupled to the hardware interconnect; and
a system-on-chip,
wherein the CPU core, the hardware interconnect, the first set of hardware components, the second set of hardware components, and the shared memory are integrated on the system-on-chip.

17. The device of claim 14,
wherein the first set of hardware components is provided in a first sub-device,
wherein the second set of hardware components is provided in a second sub-device that is coupled to the first sub-device via the hardware interconnect, and
wherein the first sub-device is configured to control the second sub-device, or the second sub-device is configured to control the first sub-device.

18. The device of claim 14,
wherein the first hardware component comprises a first instance of a bus-width conversion circuit, and
wherein the second hardware component comprises a redundant instance of the bus-width conversion circuit.

19. The device of claim 14, wherein the first hardware component is configured to:
receive, in parallel, a set of data bits; and
output the set of data bits as a plurality of sequential data words to the hardware interconnect,
wherein a bit width of each word of the plurality of sequential data words outputted by the first hardware component is less than a bit width of the set of parallel data bits received by the first hardware component.

20. The device of claim 14, wherein the first set of hardware components includes a logic gate having an input coupled to the second output of the first hardware component.

* * * * *